United States Patent
Dalziel

(10) Patent No.: US 7,102,992 B1
(45) Date of Patent: Sep. 5, 2006

(54) CONTACT OPTICAL HEAD FOR DATA STORAGE

(75) Inventor: Warren Dalziel, Monte Sereno, CA (US)

(73) Assignee: TermStar Corporation, Milpitas, CA (US)

( * ) Notice: Subject to any disclaimer, the term of this patent is extended or adjusted under 35 U.S.C. 154(b) by 602 days.

(21) Appl. No.: 09/917,250

(22) Filed: Jul. 27, 2001

Related U.S. Application Data

(60) Provisional application No. 60/221,591, filed on Jul. 27, 2000.

(51) Int. Cl.
  *G11B 11/24* (2006.01)
  *G11B 7/00* (2006.01)

(52) U.S. Cl. ............... 369/300; 369/112.24; 369/13.33

(58) Field of Classification Search ................ 369/300, 369/126, 13.33, 44.11, 44.23, 99, 44.14
  See application file for complete search history.

(56) References Cited

U.S. PATENT DOCUMENTS

| | | | |
|---|---|---|---|
| 5,107,107 A * | 4/1992 | Osborne ................ 250/231.14 |
| 5,351,229 A * | 9/1994 | Brezoczky et al. ........... 369/99 |
| 5,432,763 A * | 7/1995 | Campbell et al. ........ 369/44.19 |
| 5,471,439 A * | 11/1995 | Katayama et al. ....... 369/13.17 |
| 5,729,393 A | 3/1998 | Lee et al. |
| 5,870,362 A * | 2/1999 | Boutaghou ............... 369/44.14 |
| 5,881,042 A * | 3/1999 | Knight ........................ 369/99 |
| 5,940,549 A * | 8/1999 | Wilde et al. .................. 385/15 |
| 5,970,038 A * | 10/1999 | Boutaghou et al. ....... 369/13.13 |
| 6,084,848 A * | 7/2000 | Goto .......................... 369/121 |
| 6,134,195 A * | 10/2000 | Kawamura ............... 369/44.23 |
| 6,178,157 B1 * | 1/2001 | Berg et al. .................. 369/300 |
| 6,262,953 B1 * | 7/2001 | Kahlman et al. ......... 369/44.11 |
| 6,272,079 B1 * | 8/2001 | Kanto et al. ............. 369/44.14 |
| 6,327,241 B1 * | 12/2001 | Boutaghou et al. ......... 369/300 |
| 6,333,900 B1 * | 12/2001 | Maro et al. .............. 369/13.17 |
| 6,434,088 B1 * | 8/2002 | Ishizaki et al. .......... 369/13.33 |
| 6,466,537 B1 * | 10/2002 | Kasama et al. ............. 369/126 |
| 6,473,389 B1 * | 10/2002 | Hirai et al. .................. 720/682 |
| 6,567,347 B1 * | 5/2003 | Fujimaki et al. ......... 369/13.02 |
| 6,611,488 B1 * | 8/2003 | Odajima et al. ........ 369/112.06 |
| 6,614,751 B1 * | 9/2003 | Katao .......................... 720/736 |
| 6,618,330 B1 * | 9/2003 | Kawasaki et al. ........ 369/13.23 |
| 6,633,513 B1 * | 10/2003 | Kim et al. ................ 369/13.13 |
| 6,683,845 B1 * | 1/2004 | Kishima et al. ......... 369/275.2 |
| 6,757,221 B1 * | 6/2004 | Uno et al. ................ 369/13.32 |
| 2002/0015373 A1 * | 2/2002 | Novotny et al. .............. 369/71 |

* cited by examiner

*Primary Examiner*—Brian E. Miller
(74) *Attorney, Agent, or Firm*—Fish & Richardson P.C.

(57) ABSTRACT

Techniques and devices based on contact optical heads in optical storage devices and systems. In one implementation, a load actuator is provided in an optical storage device and is operable to apply a force to cause the optical head to contact the optical disk at a contact location of an optical interfacing surface when reading or writing data and the optical interfacing surface is a curved surface with a protruded apex at or near which the load actuator causes the optical head to contact the optical disk during reading or writing data.

22 Claims, 11 Drawing Sheets

DIAPHRAM SPRING

CONTACT OPTICAL HEAD FOR DATA STORAGE

This application claims the benefit of U.S. Provisional Application No. 60/221,591 filed on Jul. 27, 2000.

BACKGROUND

This application relates to optical data storage, and more particularly, to optical head modules for reading data from or writing data to optical storage media.

Various optical storage devices and systems have been developed. One type of optical storage systems use an optical head to focus a monochromatic optical beam to a small spot on a recording layer of a storage medium for reading or writing data. The optical head may be positioned over the medium by a spacing greater than one wavelength, i.e., in a "far-field" optical configuration, where the optical energy is coupled between the optical head and the medium by light propagation. An optical head with a large numerical aperture can produce a small spot size. The diffraction effect in light propagation, however, limits the numerical aperture to less than unity. The areal density of such an optical storage device, hence, is limited by this diffraction-limited spot size which has a lower limit on the order of one half wavelength.

An optical storage system may also be configured to operate in a "near-field" configuration to achieve an areal density for data storage higher than that of the far-field configuration. In a typical near-field configuration, the optical head is spaced from the optical medium by a distance on the order of or less than one wavelength of the optical energy. The optical coupling between the optical head and the medium, therefore, can be effectuated at least in part by evanescent coupling, with or without light propagation. Some near-field devices couple optical energy through both evanescent coupling and coupling through light propagation. An effective numerical aperture of the optical head in such a near-field configuration can be greater than unity. Hence, a near-field optical storage system can achieve a focused beam spot size much less than one half wavelength and to realize a high areal storage density.

The optical head is an important part of an optical storage system and its properties can significantly affect the overall performance of the system. For example, focusing of an optical beam for reading or writing is primarily determined by the optical head. The optical head also controls other operations of the system, including, among others, recording of data, signal detection, beam tracking on the data tracks, and certain code detection. The design of the optical head and its interfacing with the optical storage medium need special features to accommodate for the near-field nature of interaction and associated technical issues.

DETAILED DESCRIPTION

Figure 1:
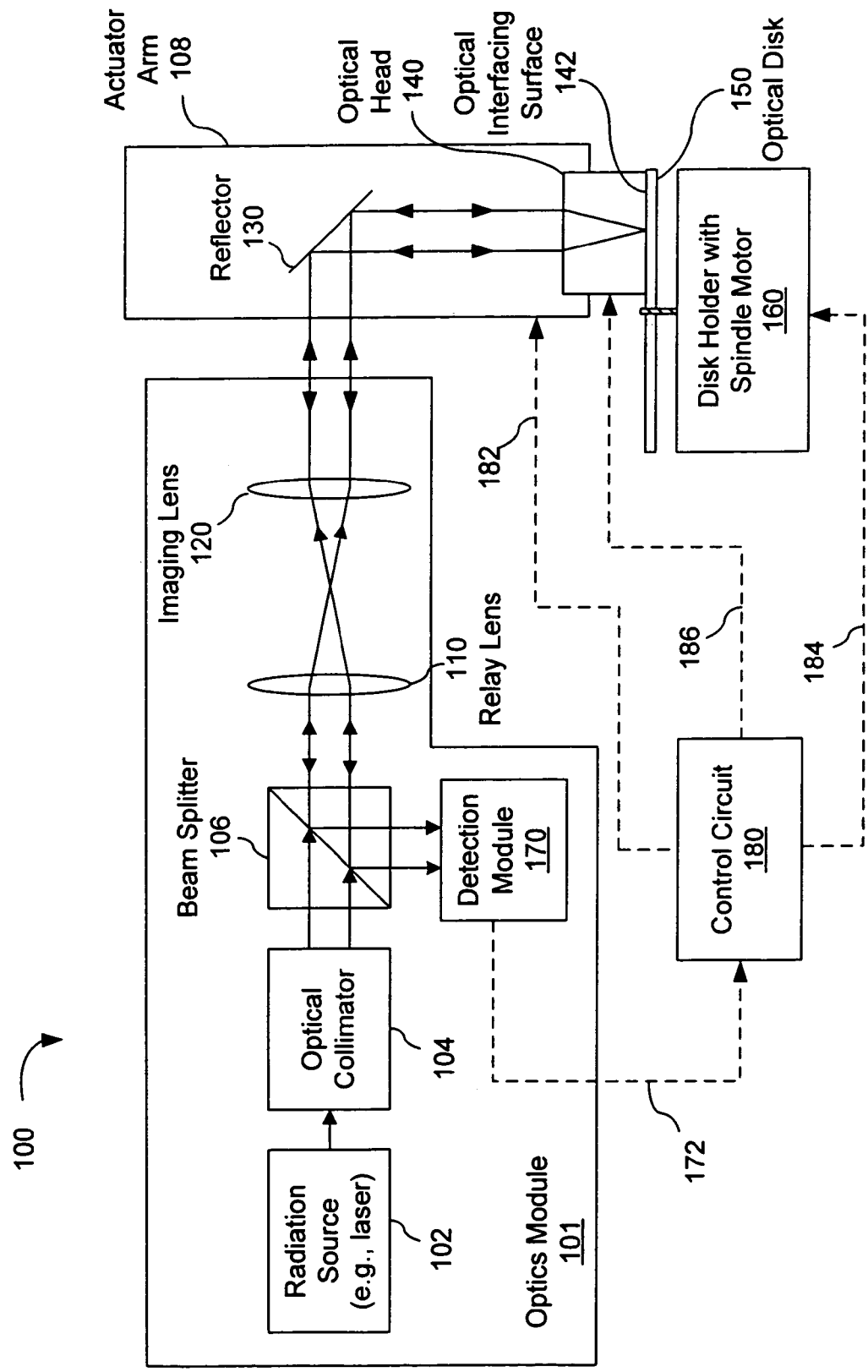
FIG. 1 shows one embodiment of an optical storage system having a contact optical head.

An optical head of an optical storage device or system generally includes an optical interfacing surface through which optical energy is coupled between the optical storage medium and the optical head. In many optical storage devices, the optical head is suspended or "flies" over the surface of the optical disk with an air gap in between. Since the optical energy is coupled through this air gap, the spacing or thickness and transparency of this air gap can affect the focusing of the optical beam on the storage layer of the disk. Hence, it is desirable to maintain this air gap substantially at a constant thickness during reading or writing operations. It is also desirable to prevent contamination build-up in the air gap. These conditions are desirable in both the far-field configuration and the near-field configuration.

The near-field configuration devices may be particularly sensitive to variations of this spacing and contamination due to the closeness between the optical interfacing surface of the head and the medium surface. In some near-field devices, this spacing may be on the order of only 50 nm. Hence, a small variation or contamination in the air gap spacing may cause a large percentage change in the coupled optical energy that is beyond the tolerance range of such variations. As a result, the performance of the device is adversely affected. Exemplary conditions that may cause variation in the air gap include, contaminate particles or materials present either on the optical interfacing surface of the head or the medium surface, non-flat medium surface caused by, e.g., thickness variations of the disk substrate or deposited thin-film layers.

The techniques and devices of this application are designed to keep the optical interfacing surface of the optical head in contact with the medium surface during normal reading or writing operations. Hence, there is no need for an active servo control for monitoring and controlling the spacing between the optical interfacing surface and the medium surface as used in some flying head systems. Assuming the direction perpendicular to the medium surface is the z direction, this contacting optical head moves on the medium surface to change its z position while maintaining the contact under a pressure pressing it against the medium surface when the optical head is loaded on the medium surface in operation. Hence, the spacing between the optical interfacing surface of the optical head and the medium surface is essentially a constant by virtue of the contact. Any variation in the spacing caused by the non-flatness of the medium, therefore, is automatically compensated for by the contact. The contact can also effectively "clean" the optical interfacing surface of the head and the medium surface. This contact cleaning can prevent any material such as debris or contaminants from building up between the optical interfacing surface of the head and the medium surface. The spacing variation and optical obscurity that would otherwise result due to the material buildup on either the interfacing optical surface or the medium surface thus may be substantially reduced or eliminated.

FIG. 1 illustrates one embodiment of an optical storage system 100 with an optical head 140 based on the above contact head design. A radiation source 102 such as a laser produces a beam at a specified wavelength for recording and retrieving data. An optical disk 150 includes at least one storage layer for data storage. The storage layer is formed of a suitable material such as a magneto-optical material or phase-change material. Data is spatially distributed and stored in the storage layer by a suitable encoding method. An optical beam from the radiation source 102 is collimated by an optical collimator 104 and then projected to the optical head 140 by a relay lens 110 and an imaging lens 120.

A disk holding unit 160 holds the optical disk 150 in contact with the optical head 140 during operation for coupling optical energy between the optical head 140 and the disk 150. The optical disk 150 may be a removable medium or a fixed medium. The disk holding unit 160 includes a spindle for holding the disk 150 and a spindle motor that rotates the disk 150 around the spindle at a desired speed. A disk load and unload unit may also be included when the disk drive 100 is the removable type in which a disk can be removed and a different disk can be loaded.

The optical head 140 is configured to produce a lensing effect and thereby to focus the beam to a desired recording layer in the disk 150. The optical head 140 also couples the reflected beam from the disk 150 to a detection module 170 that includes at least one data detector to extract data signals from the reflected beam and a tracking detector to produce a tracking error signal indicating the relative position of the beam from a desired track on the disk. The optical head 140 has an optical interfacing surface 142 through which the optical energy is coupled between the head 140 and the disk 150. During normal operations, this interface surface 142 is kept in contact with the disk surface of the disk 150.

A beam splitter 106 may be disposed to guide the reflected beam from the disk 150 to the detection module 170. The output beam from the radiation source 102 may be polarized and the beam splitter 106 may be a polarizing prism in order to transmit the output beam while directing the reflected beam to the detection module 170 by using a polarization rotator (e.g., a quarter wave plate between the beam splitter 106 and the disk 150).

The optical system 100 implements an actuator 108 to hold and move the optical head 140 over desired positions of the disk 150 for reading or writing data. As described below, the actuator 108 includes a mechanism to confine the movement of the head 150 along the z direction substantially perpendicular to the disk 150 with minimum lateral movement along the disk 150 when the actuator 108 places the optical head 140 at a selected track on the disk 150. A reflector 130 may be placed on the actuator 108 to couple radiation to and from the optical head 140 so that the beam impinging upon the disk 150 is substantially perpendicular to the disk surface. The optical head 140 may be engaged to the actuator 108 by a suspension arm so that the optical head 140 is in contact with the disk 150. Either a linear actuator or a rotary actuator may be used.

Optical elements, including the light source 102, the detection module 170 and beam guiding elements 106, 110, 120, 130, and the optical head 140, may be fixed relative to one another with a predetermined spatial relation. The light source 102, the collimator 104, the beam splitter 106, the detection module 170, and beam guiding elements 110, 120, may be fixed in an optics module 101. The optics module 101 may be fixed on a base of the disk drive 100 to form a fixed optics module or mounted on the actuator 108 to move with the actuator 108 as a movable optics module.

A control unit 180 generates a control signal 182 to control the operation of the actuator 108 and to receive the signal 172 from the detection module 170 that includes the tracking error signal or the read-only signal. When the disk 150 is read, the signal 172 also includes the magneto-optical signal or the phase change signal embedded with data to be read. The control unit 180 also controls one or more beam-steering devices that control the direction of the beam to the optical head 140 in response to the tracking error signal. In addition, the control unit 180 may produce a control signal 184 to control the operations of the disk holder 160 such as loading, unloading, and spinning the disk 150 with the spindle motor. Certain aspects of the system 100, and in particular features of the system 100 when operated in the near-field configuration, may be understood by the disclosure in U.S. Pat. No. 6,243,350.

Figure 2:
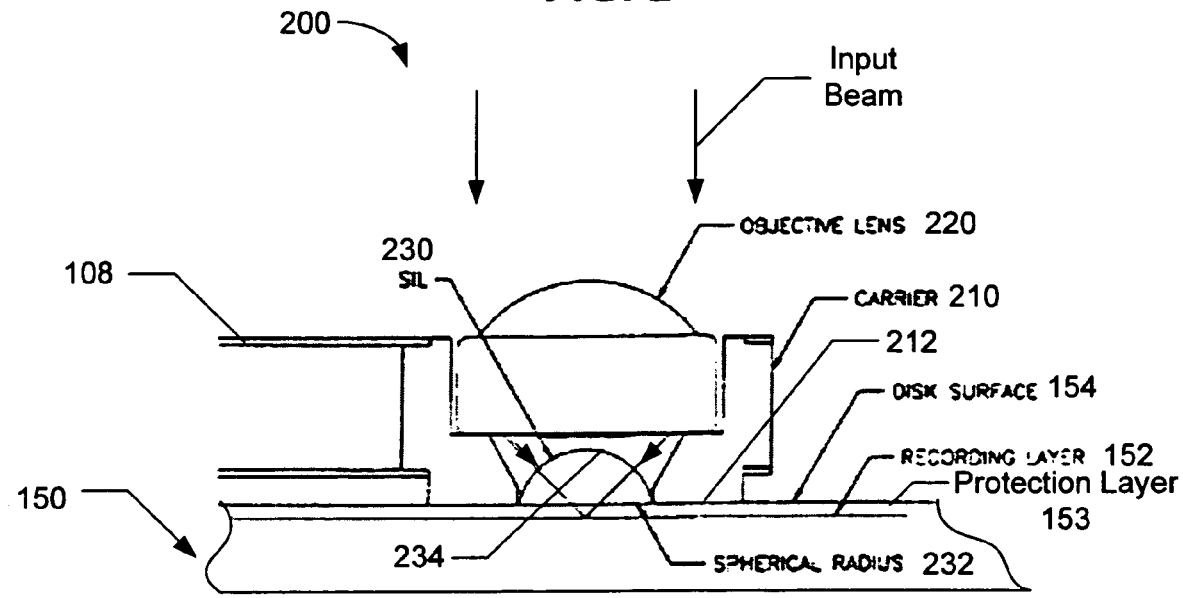
FIGS. 2 and 2A show one exemplary contact optical head.

FIG. 2 illustrates one embodiment 200 of the contact optical head 140 in FIG. 1 and its position relative to the optical disk 150 during operation. The optical head 200 includes an objective lens 220 and a coupling lens 230 to couple the beam to and from the disk 150 in contact. A head carrier 210 is used to hold the objective lens 220 and the coupling lens 230 relative to each other and is engaged to the actuator 108. In this particular embodiment, the objective lens 220 and the coupling lens 230 are spatially fixed to the head carrier 210 and have predetermined spacing from each other. Alternative implementations may use an actuator to adjust the spacing between the objective lens 220 and the coupling lens 230. The carrier 210 is configured to have an optical transparent path where the lenses 220 and 230 are placed. The bottom surface 212 of the carrier 210 may be made from or coated with a wear resistant glass or ceramic material.

Figure 2A:
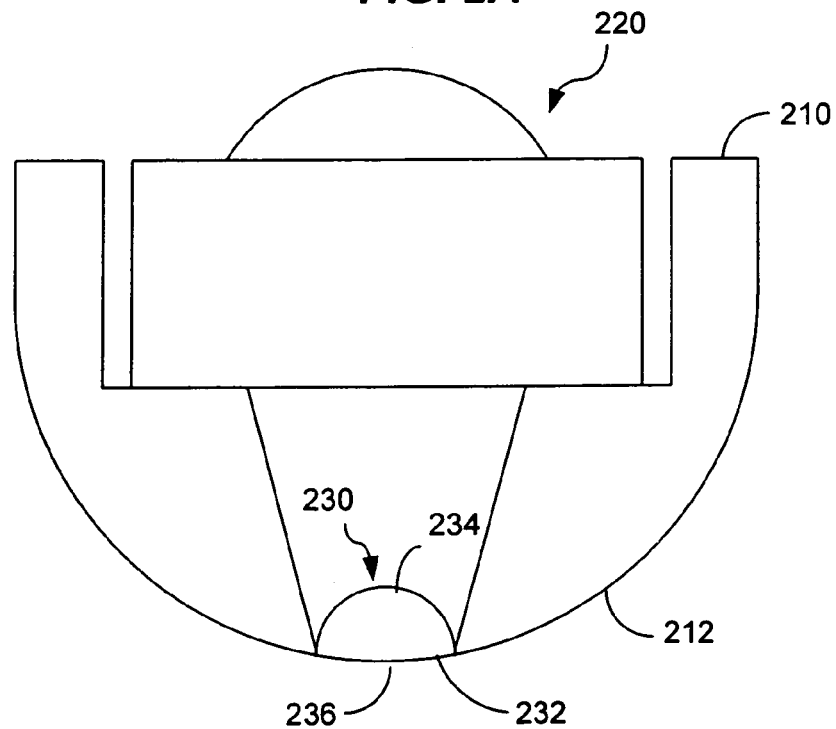

FIG. 2A shows that the coupling lens 230 may be designed to have a spherical optical interfacing surface 232 so that its apex 236 or a region near the apex 236 is in contact with the disk 150 during operation. The radius of curvature of the interfacing surface 232 is much greater than that of the surface 234 of the coupling lens 230 such that the focused beam produced by the objective lens 220 from focusing the received collimated input beam "sees" substantially flat area at or near the apex 236 on the spherical interfacing surface 232. Some light rays of the focused beam from the objective lens 220 are totally reflected and are coupled through the surface 232 by evanescent coupling. When designed and operated in the near-field configuration, the interfacing surface 232 is in contact with a layer 153 of the disk 150. The desired focusing of the beam on the recording layer 152 in the disk 150 is maintained by the contact between the interfacing surface 232 and the disk 150. The carrier 210 may also be designed to make its output carrier surface 212 substantially co-spherical with the optical interfacing surface 232. Hence, when the optical head 200 is loaded onto the disk 150 for reading or writing data, a small area at or near the apex 236 of the spherical interfacing surface 232 is in contact with the disk 150. The optical energy is coupled through this small contacting area.

The disk 150 may include at least one transparent protection layer 153 over the recording layer 152 to protect the recording layer 152 from being in direct contact with the optical head 200. In addition, the total thickness of the protection layer 153 and any other layers that may be formed between the recording layer 152 and the protection layer 153 is substantially the desired spacing between interfacing surface 232 and the recording layer 152. A layer of lubricant material may be applied over the disk surface 154 to reduce the contact friction between the optical head 200 and the disk 150. The interfacing surface 232 of the coupling lens 230 may also be coated with a transparent protection layer.

Notably, the above spherical surface for contacting the disk 150 may also be replaced by another curved surface with a protruded apex at or near which the disk is to be contacted during reading or writing data and the optical beam is coupled through the contact location between the disk and the optical head 200.

The coupling lens 230 may be made of a high-index optical material to produce a large effective numerical aperture ("NA"), i.e., $NA=n\sin\theta_0$, where n is the refractive index of the coupling lens 230 and $\theta_0$ is the maximum ray angle from the coupling lens 230 to the focus point. For example, a solid immersion lens ("SIL") or a graded index lens ("GRIN lens") may be used as the coupling lens 230 to achieve a NA up to and greater than unity when in the near-field configuration. In FIG. 2A, the coupling lens 230 is shown to be a SIL with a first spherical optical surface 234 with a first radius and the opposing second spherical interfacing surface 232 with a second radius much greater than the first radius. The spacing between the apex of the surface 232 and the apex of the spherical surface 234 may be equal to the radius of the spherical surface 234 or greater than the radius of the spherical surface 234. Details of the coupling lens 230 for near-field operation may be found in the aforementioned U.S. Pat. No. 6,243,350.

The actuator 108 is designed to hold the optical head 200 to place the optical interfacing surface 232 substantially parallel to the disk surface 154 when the optical head 200 is loaded on the disk surface 154 during operation. Unlike in some flying-head optical disk drives, the optical interfacing surface 232 is not tilted with respect to the disk surface 154 by design due to the air bearing action. Airborne particles or other contaminants attached to the disk surface 154 or the interfacing surface 232 may be wiped out by the contact.

Figure 3A:
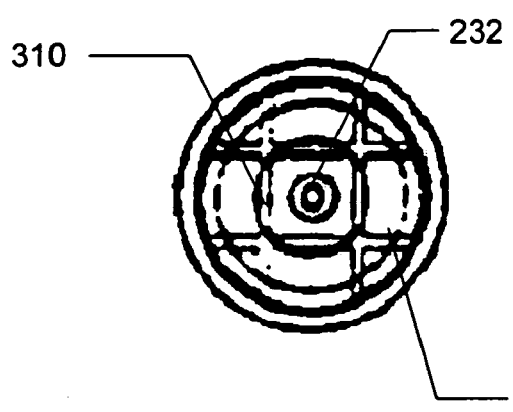
FIGS. 3A and 3B show channels formed on the bottom surface of the carrier in the optical head for reducing air resistance and removing debris.
Figure 3B:
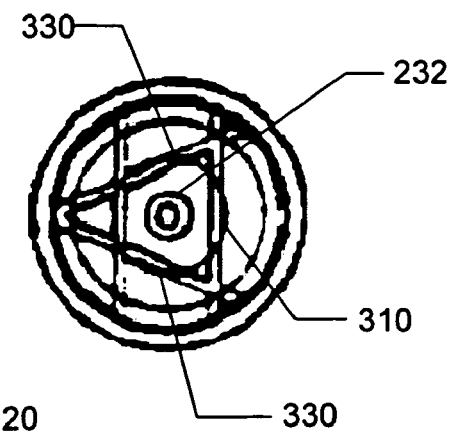

FIGS. 3A and 3B show that the carrier surface 212 may be designed to include channels or grooves as labeled by 310, 320, and 330 to conduct the air flow through the optical head 200. Such channels are desirable because the contact of the surfaces 232 and 212 with the disk surface 154 would otherwise block the air flow due to the spinning motion of the disk 150. The channels can reduce the air resistance and the tendency of the optical head 200 to "fly" or "float" over the disk 150 so that the optical head 200 remains in contact with the disk 150 during operation. The channels can also operate as cleaning slots to transfer contaminant particles. In FIG. 3A, the channels 310 and 320 are in form of a grid with channels 310 in parallel along one direction and channels 320 in parallel along an orthogonal direction. In FIG. 3B, channels 330 are not parallel to each other and form angles with respect to parallel channels 310. Other channel configurations may also be implemented.

Figure 4:
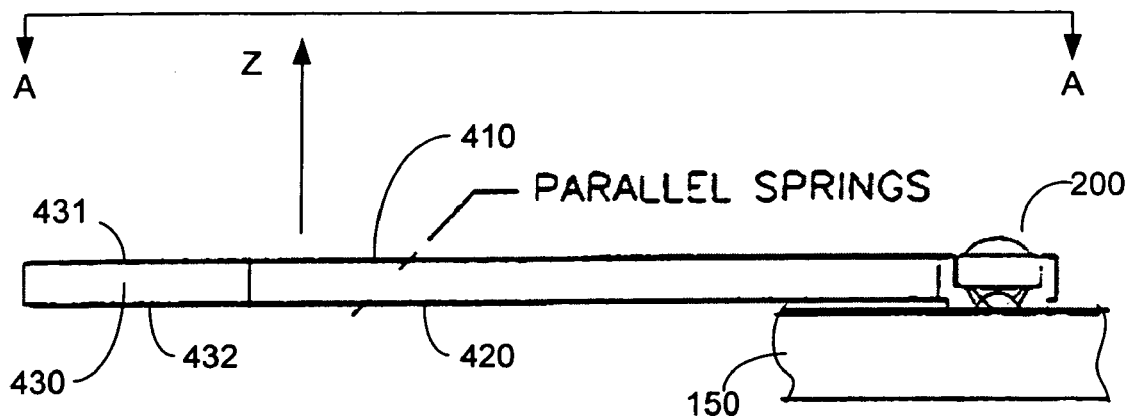
FIGS. 4 and 5 show one design of spring plates for holding the optical head.
Figure 5:
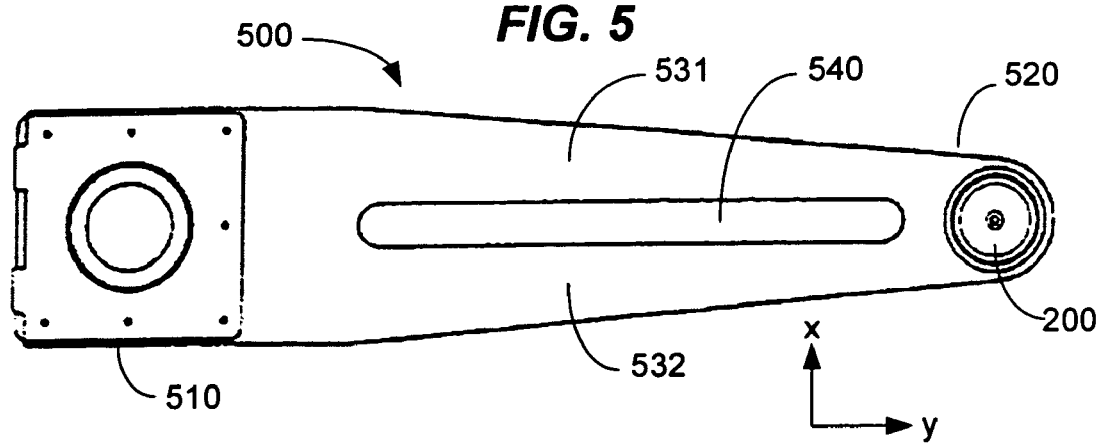

FIGS. 4 and 5 illustrate one embodiment of a head-holding part 500 of the actuator 108 that engages the optical head 200 as shown in FIG. 2 in the system 100 in FIG. 1. The head-holing part 500 includes two parallel spring plates 410 and 420 displaced from each other along the z direction that is substantially perpendicular to the spring plates 410 and 420. A block member 430 in the actuator 108 has two parallel opposing surfaces 431 and 432 for respectively engaging the spring plates 410 and 420 to the actuator 108 and for engaging the entire assembly to the actuator 108. The opposite ends of the spring plates 410 and 420 are used to engage to a part of the optical head 200 such as the carrier 210. Hence, the block member 430 and the carrier 210 also operate as the spacers between two spring plates 410 and 420. Each spring plate has a dimension in the xy plane (e.g., several millimeters) much greater than the thickness along the z direction (e.g., about 100 microns) to have a low stiffness (small spring rate) along the z direction but a high stiffness (large spring rate) along the xy plane. The parallel spring design further increases the stiffness in the xy plane. This design allows the optical head 200 to have the freedom to move along the z direction while substantially restricting or minimizing the freedom to move laterally along the xy plane parallel to the spring plates 410 and 420. In normal operation when the optical head 200 is loaded over the disk 150, the optical head 200 engaged to the parallel spring plates 410 and 420 is placed to have its optical interfacing surface in contact with and parallel to the disk surface 154 under some pressure against the disk surface 154.

FIG. 5 shows one implementation of a spring plate 500 that may be used as the spring plate 410 or 420 in a view along the lines AA of FIG. 4. The spring plate 500 is formed of a resilient or elastic material that restores its shape when deformed by less than a threshold amount. For example, metals or alloys such as a stainless steel may be used. The spring plate 500 has one end 510 for engaging to one surface of the block member 430 of the actuator 108 and the other end 520 for engaging and holding the optical head 140. As illustrated, the end 520 has an aperture through which the light passes through. The edge of the aperture is engaged to the carrier 210 in FIG. 2. The middle section includes two plate arms 531 and 532 separated by an elongated opening or slot 540. This opening 540 is designed to reduce the spring constant of the parallel springs 410 and 420 while maintaining high lateral stiffness against deformation within the plane of the each spring plate. This design and the parallel arrangement shown in FIG. 4 are combined to restrict the optical head 140 to move only along the z direction perpendicular to the spring plates 410 and 420.

Figure 6A:
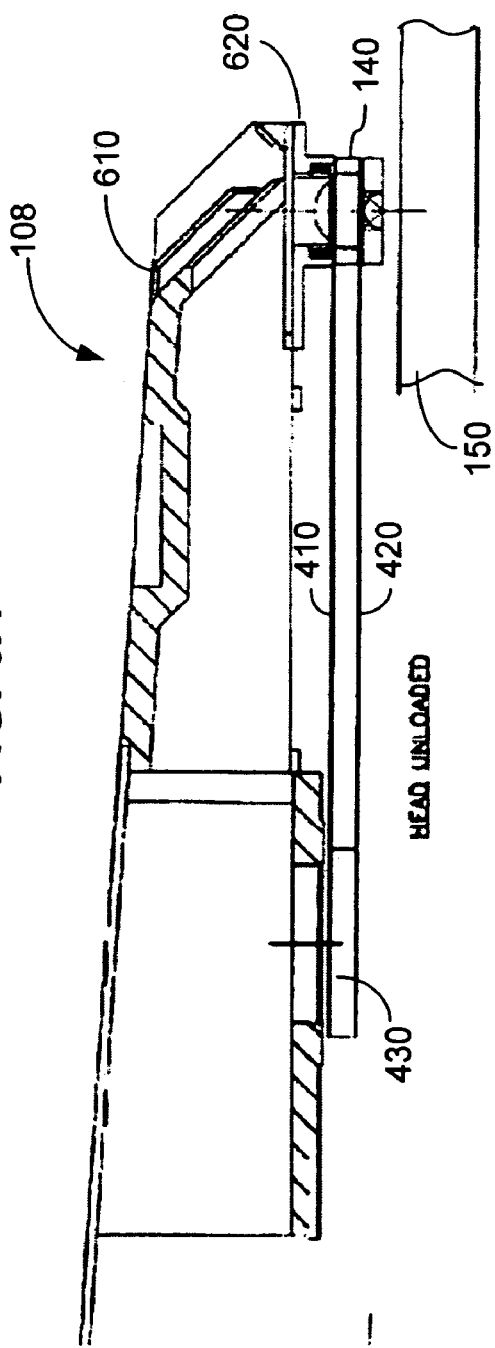
FIGS. 6A and 6B show load and unload positions of an optical head under operation of a load actuator.
Figure 6B:
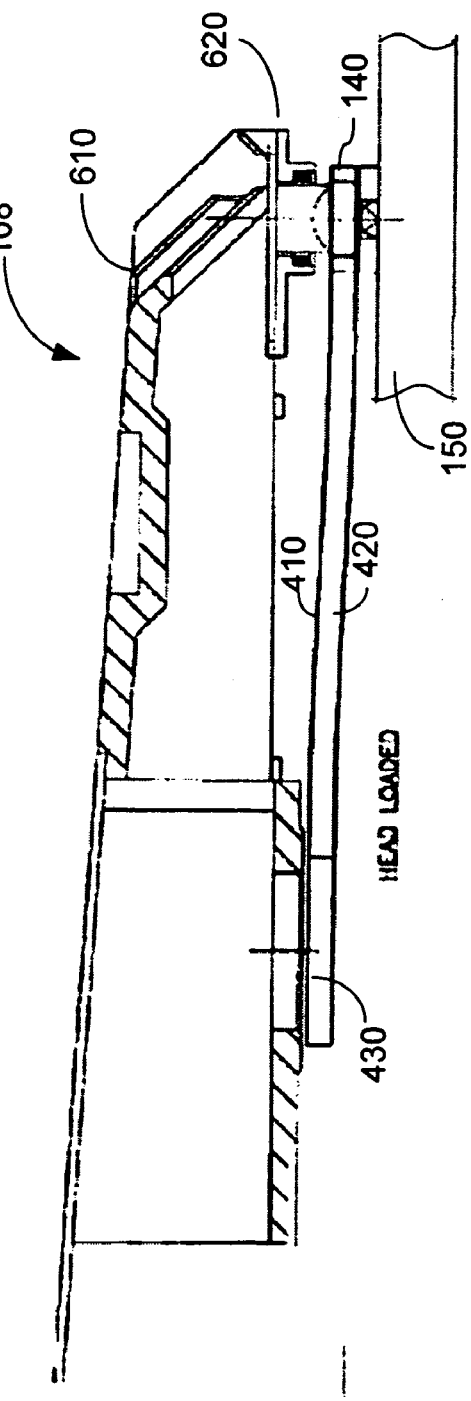

The system 100 in FIG. 1 based on the above contact design may include a head control mechanism for loading and unloading the contact optical head 140. FIGS. 6A and 6B respectively show the basic design and operation of one embodiment of this control mechanism.

According to this embodiment, the actuator 108 includes a base member 610 to which the parallel spring plates 410, 420 and the block member 430 are engaged through an attachment at the end 510. The base member 610 moves to place the optical head 140 over selected locations of the disk 150 for reading or writing data. Since the spring plates 410 and 420 are flexible, the position of the optical head 140 along the z direction perpendicular to the spring plates 410 and 420 is not fixed and can change. A load actuator 620 is implemented at a position on the base member 610 above the optical head 140 to control its position by exerting a force. In FIG. 6A, the optical head 140 is shown to be held by the load actuator 620 and is not in contact with the disk 150. Hence, although the actuator 108 may be positioned at a desired track location over the disk 150, the optical head 140 is in an unloaded position. In FIG. 6B, the load actuator 620 is set to move the optical head 140 onto the disk 150 in a loaded position for reading or writing operations.

Figure 7:
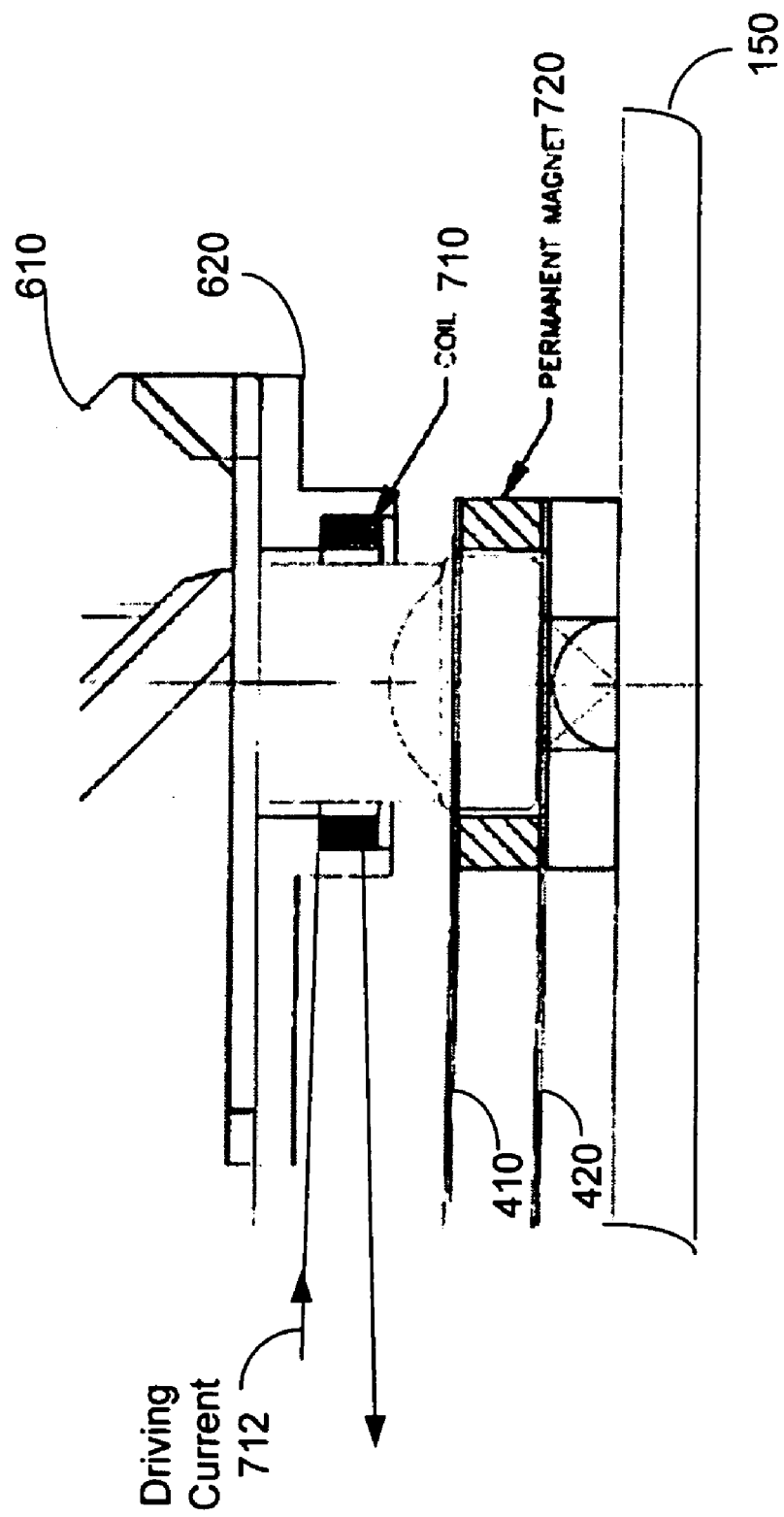
FIG. 7 shows one design for the load actuator in FIGS. 6A and 6B.

FIG. 7 shows one embodiment of the load actuator 620 in FIGS. 6A and 6B. The load actuator 620 includes a permanent magnet 720 and an electrical magnetic coil 710 with one fixed on the base unit 610 and the other fixed on the carrier 210 of the optical head 200. A driving current 712 for producing the variable magnetic field by the coil 710 is controlled by the control circuit 180 in FIG. 1. The coil 710 may be fixed to the base unit 610 for ease for placing the wires for supplying the driving current 712 while the permanent magnet 720 is fixed to the optical head 200 such as the carrier 210. The direction of the driving current 712 in the coil 710 controls the force between the coil 710 and the magnet 720 as attractive or repulsive and the magnitude of the current 712 controls the strength of the interacting force.

In addition to loading or unloading the optical head 140, the load actuator 620 may also be used to control the amount of pressure of the optical head 200 when loaded in contact with the disk 150. For example, the driving current 712 may be controlled to reduce the magnitude of the attractive force or increase the magnitude of the repulsive force between the coil 710 and the magnet 720 to increase the pressure on the optical head 200 against the disk 150 or vice versa. In general, it is desirable to minimize or substantially reduce the pressure on the optical head 200 against the disk 150 while maintaining a full contact between the optical head 200 and the disk 150 to reduce the contact friction and the wear to the optical head 200.

As described above with respect to FIG. 2, the spacing between the objective lens 220 and the coupling lens 230 may be adjustable. This adjustment may be used to provide a dynamic focusing control mechanism in contact head devices. In general, the lenses 220 and 230 are movably engaged to each other in the head carrier 210. A lens actuator is engaged to at least one of the lenses 220 and 230 to control and change the spacing between the lenses 220 and 230. This lens actuator is located in and operates within the optical head 140 and hence does not change the contact operation of the optical head 140.

Figure 8:
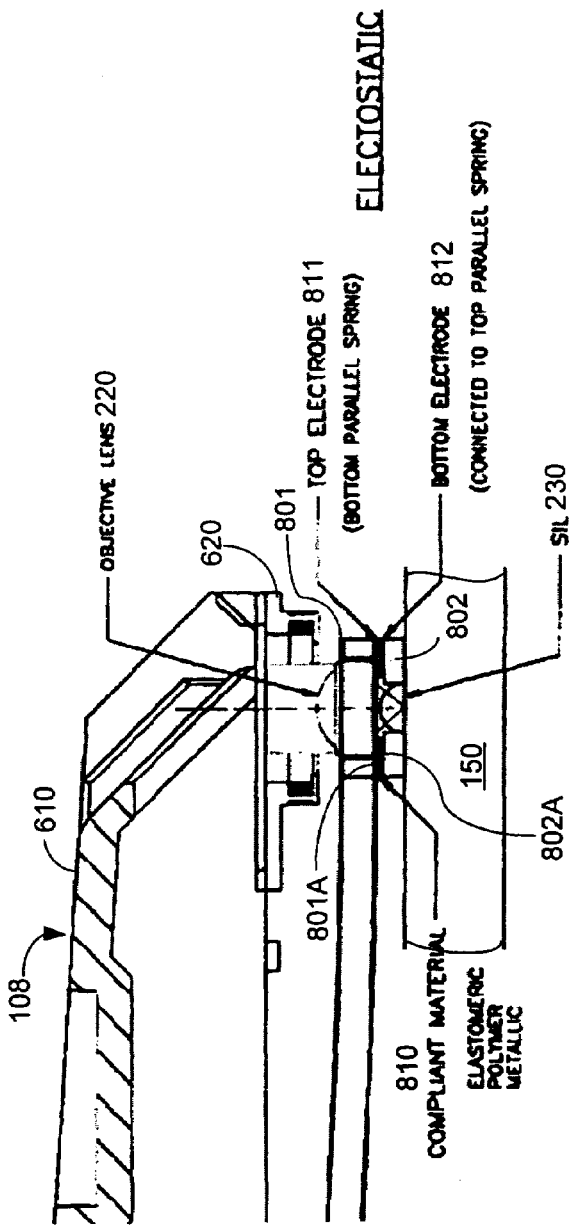
FIGS. 8, 9, 10A and 10B show different auto focusing mechanisms for adjusting spacing between the objective lens and the coupling lens of the optical head.

FIG. 8 shows one embodiment of this lens actuator based on the electrostatic interaction. The head carrier 210 has two separate carrier parts 801 and 802. The objective lens 220 is fixed to the carrier part 801 while the coupling lens 230 is fixed to the carrier part 802. The carrier part 801 may also be engaged to the permanent magnet 720 for interacting with the coil 710 as shown in FIG. 7. The bottom surface 801A of the carrier part 801 is formed with a first electrode layer 811 and the top surface 802A of the carrier part 802 is formed with a second electrode layer 812. Both electrode layers 811 and 812 have openings to allow transmission of light between lenses 220 and 230. A compliant material layer 810, formed of a material whose physical dimension changes in response to an external force, is sandwiched between and in contact with the electrode layers 811 and 812. For example, an elastomer or polymer or insulated metal spring may be used to form the layer 810. The electrostatic force between the electrode layers 811 and 812 changes the thickness of the layer 810 to adjust the spacing between the lenses 220 and 230. The two carrier parts 801, 802 and the lenses 220 and 230 are integrated together to move as a single unit with the motion of the parallel spring plates 410, 420 and the operation of the load actuator 620. Within the optical head 140, however, the two lenses 220 and 230 are movable relative to each other by operation of the lens actuator. Hence, a voltage may be applied to the electrode layers 811 and 812 and adjusted to control the fine focusing of the lenses 220 and 230 by varying the eletrostatic force and hence the compression of compliant material 810.

Figure 9:
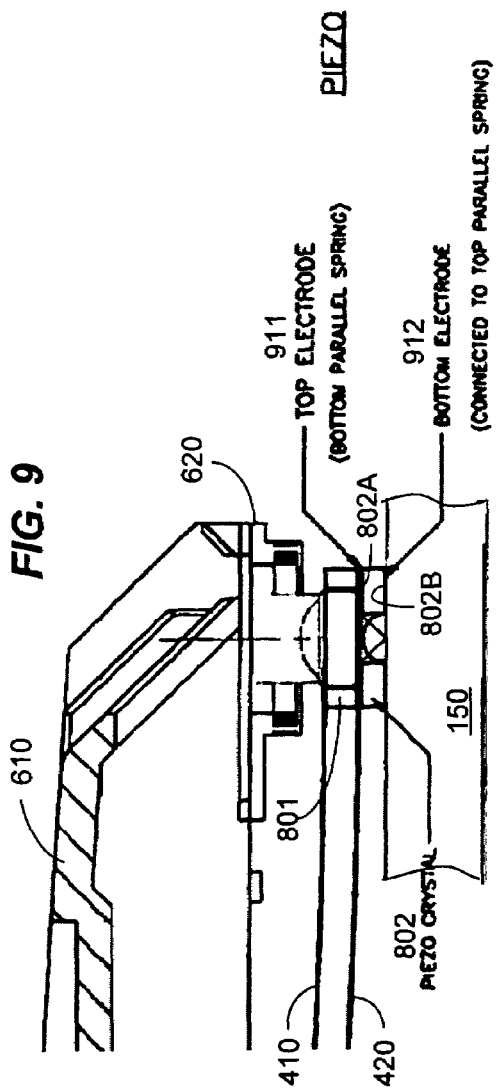

FIG. 9 shows another embodiment of the lens actuator where carrier part 802 is formed from a piezo-electric material. For example, the carrier part 802 may be a ring at the center of which the coupling lens 230 is fixed. The top surface 802A of the carrier part 802 is formed with a first electrode layer 911 and its bottom surface 802B is formed with a second electrode layer 912. As the voltage applied to the electrode layers 911 and 912 changes, the thickness of the piezo carrier part 802 changes. This shifts the position of the coupling lens 230 and hence the distance between the lenses 220 and 230.

Figure 10A:
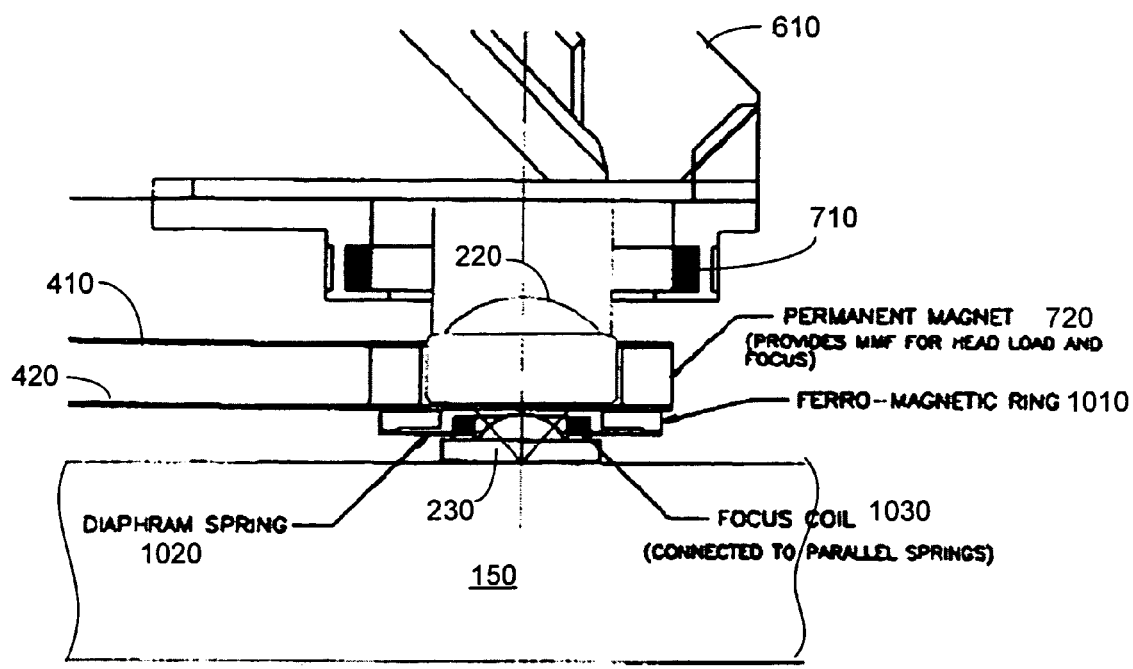
Figure 10B:
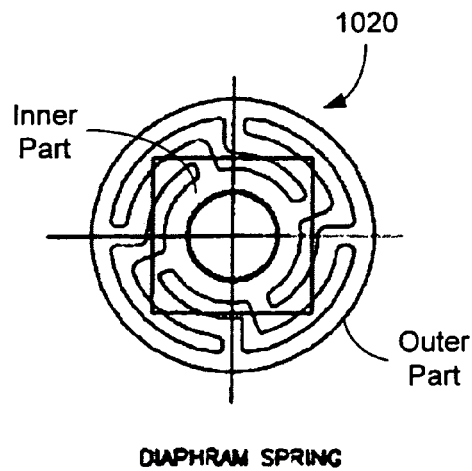

FIG. 10A shows yet another embodiment of the lens actuator based on the electromagnetic effect. The objective lens 220 is fixed to and moves with the permanent magnet 720. A magnet ring 1010 is fixed relative to the magnet 720 as one part of the lens actuator. For example, a ferromagnetic ring may be used. The lens actuator also includes a diaphragm spring 1020 with its outer portion engaged to the magnet ring 1010 and the inner portion engaged to a focus coil 1030. the inner and outer portions of the diaphragm spring 1020 can displace from each other along a direction substantially perpendicular to the diaphragm spring 1020. A focus coil 1020 is engaged to the inner portion of the diaphragm spring 1020. The coupling lens 230 is fixed to the focus coil 1030. When the driving current to the focus coil 1030 changes, the force between the magnet ring 1010 and the focus coil 1030 changes to deform the diaphragm spring 1020. This action produces a displacement between the focus coil 1030 and the magnet ring 1010 along the z direction. This displacement effectuates a change in spacing between the lenses 220 and 230 to adjust the focus. FIG. 10B shows one embodiment of the pattern of the diaphragm spring 1020 that connects the inner. The lens actuator may be magnetically shielded from the stray magnetic fields of the electromagnetic load actuator 620.

Figure 11:
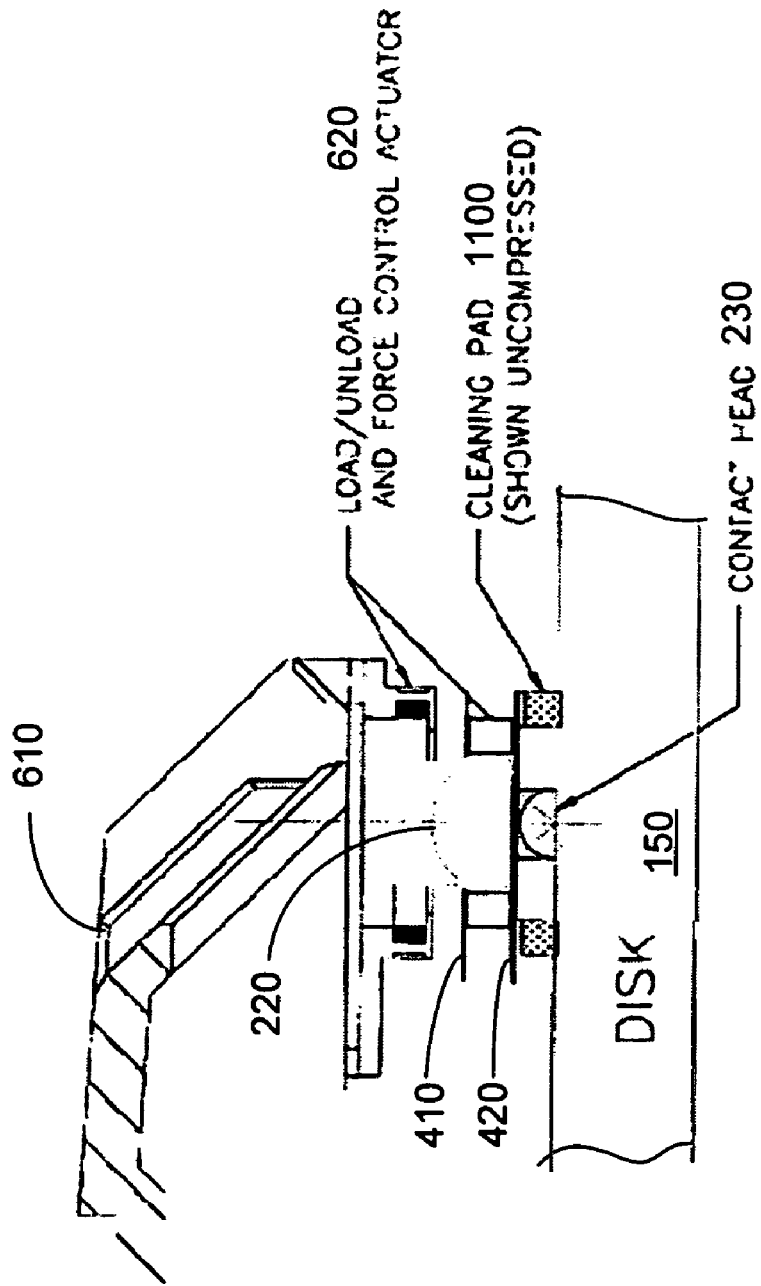
FIG. 11 shows a contact head with a cleaning pad.

It is further contemplated that, a cleaning element may be attached to the contact optical head 140 to touch and sweep the surface of the disk 150 during operation. This technique may be used to maintain the optical head 140 and the disk 150 clean, in particular in removable disk drives. FIG. 11 shows that a cleaning pad 1100 is designed to surround the coupling lens 230. A compressible material may be used to form the pad 1100.

Figure 12:
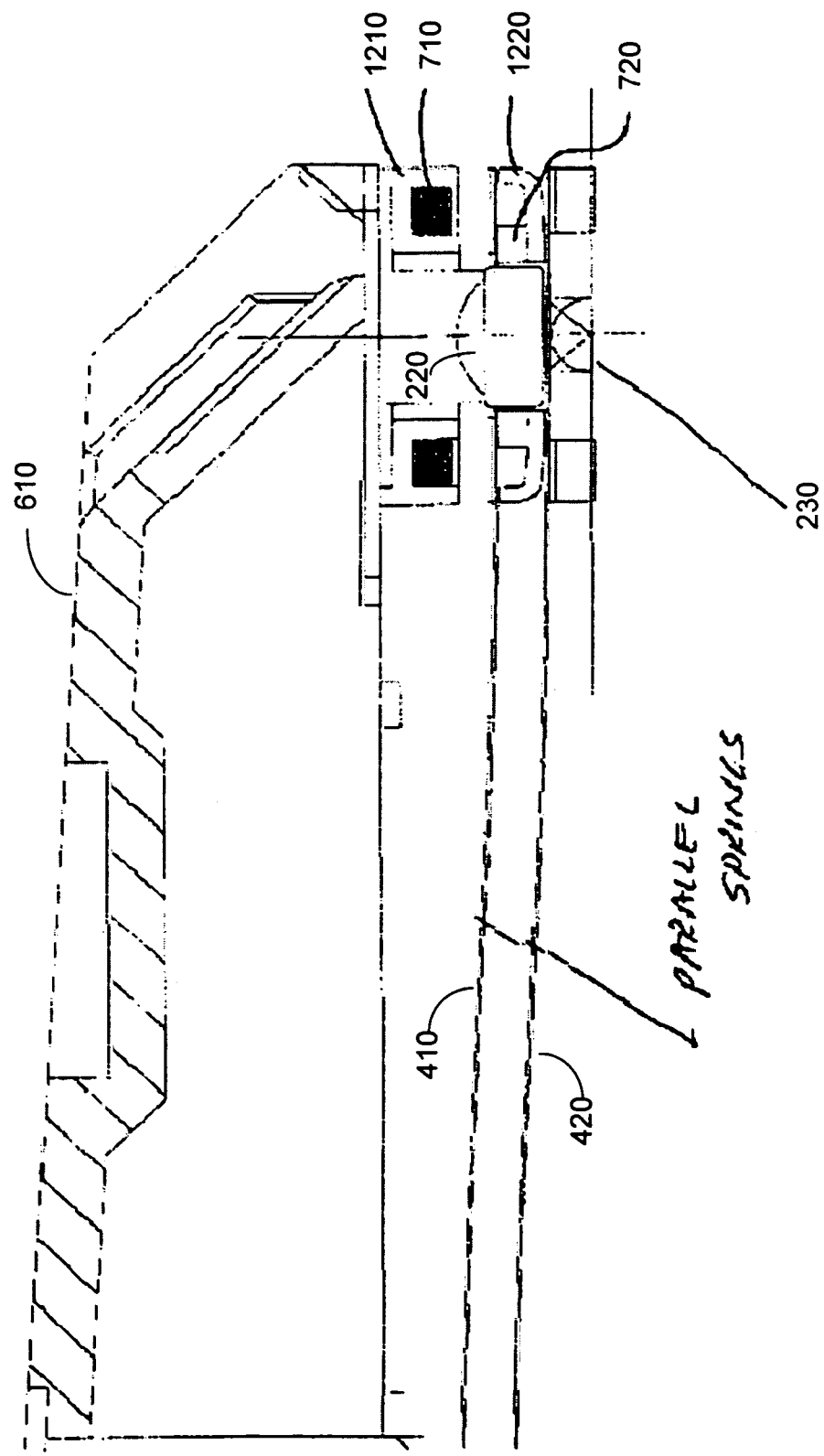
FIG. 12 shows another design for the load actuator in FIGS. 6A and 6B.

FIG. 12 shows another embodiment of a head load actuator. Mounted to the base 610 of the actuator is a coil 710 and a circular ferromagnetic coil holder 1210. Mounted to the parallel springs 410 and 420 and head 200 with lenses 220 and 230 is a permanent magnet 720 and a circular ferromagnetic magnet holder 1220. When the coil 710 is not energized in absence of a driving current, the magnet 720 and magnet holder 1220 are attracted to the ferromagnetic coil holder 1210 and unload the head 200 from the disk 150. The head 200 is held securely in the unloaded position without power or active control. To load the head 200, the coil 710 is energized to produce a counter force so as to repel the magnetic attraction between the permanent magnet 720 and the ferromagnetic coil holder 1210. This forces the head 200 into contact with the disk 150 in a controlled manner. The head load force can be controlled by varying the driving current to the coil 710. The above auto focusing mechanisms for controlling spacing between lenses 220 and 230 may also be incorporated into this design.

Figure 13:
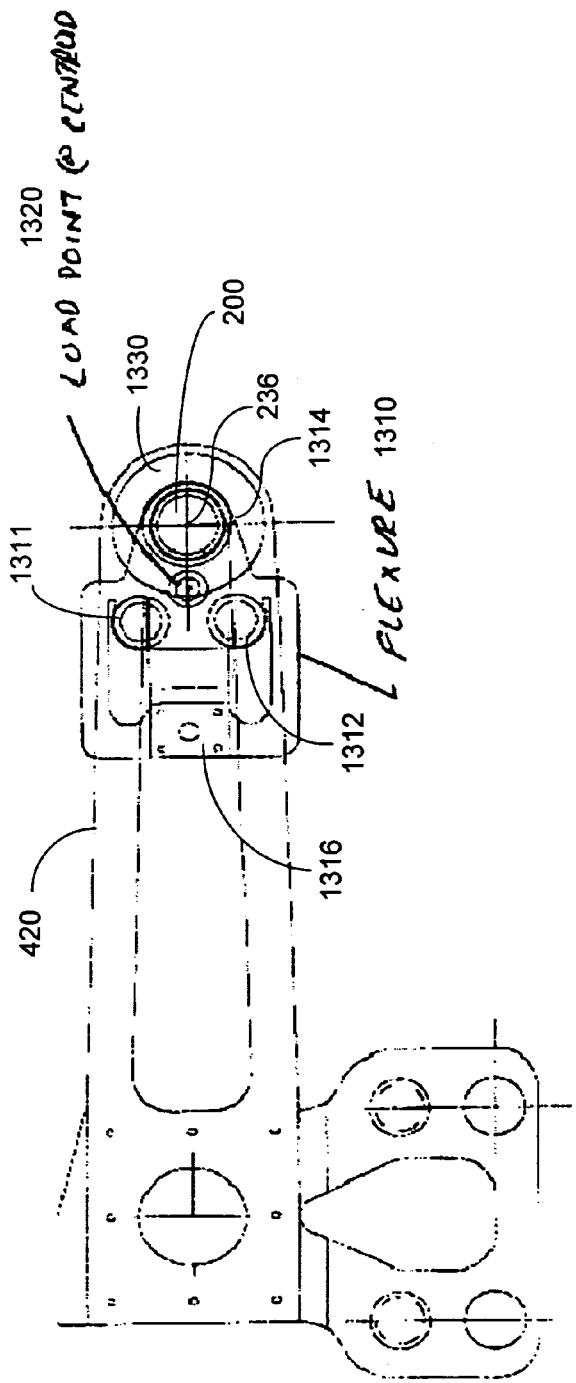
FIGS. 13 and 13A show a 3-point load design for the contact optical head.
Figure 13A:
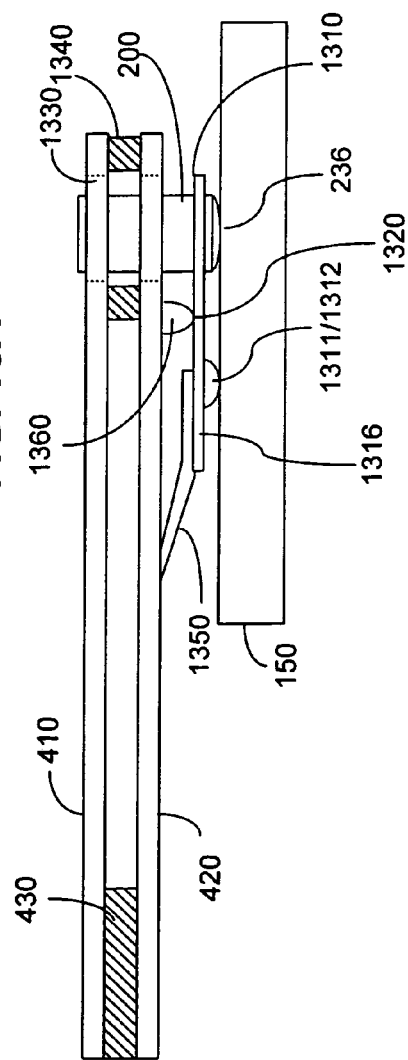

FIGS. 13 and 13A show another technique for engaging the optical head 200 to the parallel spring plates 410 and 420. The optical head 200 is not directly engaged to the spring plates 410 and 420. Instead, a flexure 1310 is engaged to the spring plate 420 and is used to hold the optical head 200. The spring plate 420 is designed to have an extension 1350 for engaging the flexure 1310 so that the flexure 1310 and the optical head 200 are flexibly engaged to the spring plate 420 and are movable relative to the spring plate 420.

Two support pads 1311 and 1312 are formed on one side of the flexure 1310 where the spherical interfacing surface 232 of the coupling lens 230 is located. The tips of the support pads 1311 and 1312 and the apex 236 of the spherical interfacing surface 232 are substantially in the same plane. When the support pads 1311, 1312, and the spherical interfacing surface 232 are all pressed against the disk 150, the contact location on the spherical interfacing surface 232 is at a uniquely-defined location by the 3-point design which is at or near the apex 236. Hence, as long as the system is optically designed to focus the beam at that uniquely-defined location, the beam is coupled through the contact point when the optical head is located with all three points are pressed against the disk surface. The combination of the parallel spring plates 410, 420 and the flexure 1310 provides the compliance for such operation and to ensure that the appropriate part of the SIL lens is in contact with the disk. The support pads 1311 and 1312 may be designed to have spherical tips for contacting the disk. A head load actuator is implemented to apply a force at a centered load point 1320.

The flexure 1310 has one end 1316 that is engaged to the extension 1350 of the lower spring plate 420. The opposite end of the flexure 1310 is engaged to hold the optical head 200. Each of the spring plates 410 and 420 is designed to have a clearance opening 1330 to allow the optical head 200 to move freely along the z direction without touching the spring plates 410, 420. Referring to FIG. 13A, a load support 1360 is formed in the spring plate 420 to contact the centered load point 1320 when the head load actuator is operated to apply a force to the parallel springs 410 and 420, the load support 1360 is pressed against the flexure 1310 at the load point 1320. This action in turn presses the support pads 1311, 1312, and the spherical interfacing surface 232 against the disk 150.

The parallel configuration of the spring plates 410 and 420 are maintained by the block member 420 on one side and a spacer 1340 on the other side. The spacer 1340 may be a ring spacer with a center aperture to allow the optical head 200 to more along the z direction.

Figure 14:
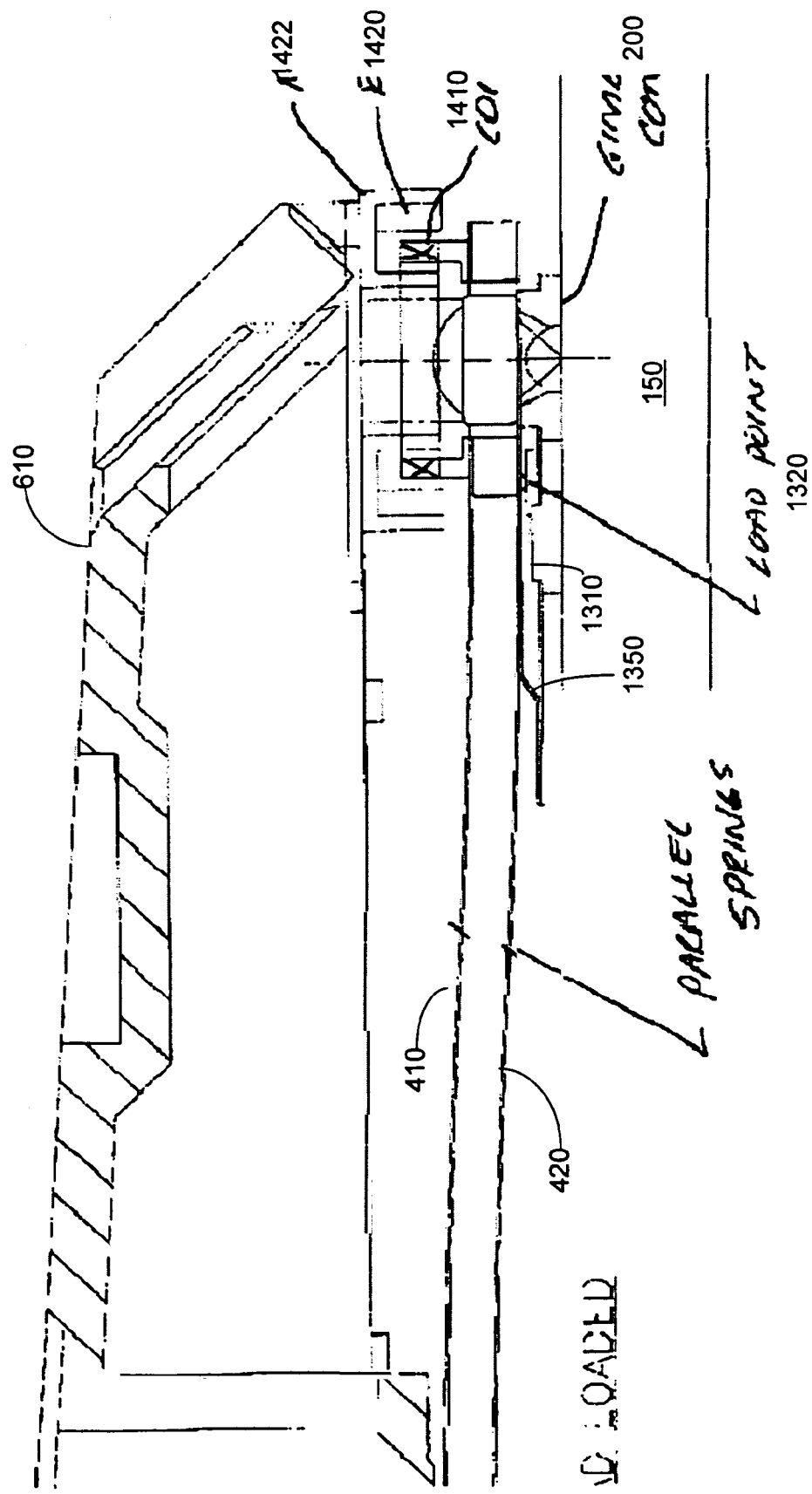
FIG. 14 shows a load actuator for the contact optical head in FIGS. 13 and 13A.

The head load actuators shown in FIGS. 7 and 12 may be used by using a permanent magnet ring as the spacer 1340 between the spring plates 410 and 420. FIG. 14 shows another embodiment of the head load actuator where a load coil 1410 is engaged to the spring plates 410 and 420 and a permanent magnet ring unit 1420 is engaged to the base unit 610 of the actuator 108. A ferromagnetic ring holder 1422 may be used to hold the permanent magnet ring unit 1420 to the base 610. In operation, when the load coil 1410 is not energized, optical head 200 is unloaded. When the driving current is applied to the load coil 1410, the repelling force between the permanent magnet ring unit 1420 and the load coil 1410 forces the optical head 200 to load on the disk by a force applied through the load support 1360 to the flexure 1310.

Only a few embodiments are disclosed. However, it is understood that variations and enhancements may be made without departing from the spirit of and are intended to be encompassed by the following claims.

The invention claimed is:

1. A device, comprising:
   a disk holder operable to hold and spin an optical disk;
   an optical head having an optical interfacing surface which is operable to couple radiation energy to and from the optical disk held by the disk holder for reading data from or writing data to the optical disk;
   an actuator engaged to said optical head and operable to move and position said optical head over the disk; and
   a load actuator operable to apply a force to cause said optical head to contact the optical disk at a contact location of said optical interfacing surface when reading or writing data,
   wherein said optical interfacing surface is a curved surface with a protruded apex at or near a location where said loud actuator causes said optical interfacing surface to contact the optical disk during reading or writing data.

2. The device as in claim 1, wherein said curved surface is spherical.

3. The device as in claim 1, wherein said optical head is configured to have at least a portion of optical energy totally reflected at said optical interfacing surface.

4. The device as in claim 3, wherein said optical head includes a coupling lens having a first spherical optical surface with a first radius of curvature and a second, opposing spherical optical surface with a second radius curvature greater than said first radius of curvature, wherein said optical interfacing surface is a portion of said second spherical optical surface.

5. The device as in claim 4, wherein said optical head includes an objective lens to couple optical energy to or from said coupling lens.

6. The device as in claim 5, further comprising a lens actuator engaged to at least one of said objective and said coupling lenses and operable to change a spacing therebetween in response to a control signal.

7. The device as in 1, wherein said optical head includes a carrier surface substantially in said optical interfacing surface, wherein said carrier surface includes a plurality of grooves to reduce air resistance of said optical head when said optical interfacing surface is in contact with the spinning optical disk.

8. The device as in 1, further comprising two parallel springs that engage said optical head to said actuator and confine motion of said optical head in a direction substantially perpendicular to the optical disk.

9. The device as in claim 8, further comprising a flexure having one end engaged to said two parallel springs and another end engaged to said optical head, said flexure configured to have two support pads substantially in a common plane with said contact location of said optical interfacing surface, wherein said load actuator is operable to press said two support pads and said contact location of said optical interfacing surface on the optical disk when said force is applied during reading or writing data.

10. A device, comprising:
   a disk holder operable to hold and spin an optical disk;
   an optical head having an objective lens and a coupling lens operable to couple radiation energy to and from the optical disk for reading data from or writing data to the optical disk, said coupling lens having an optical interfacing surface through which the radiation energy is coupled;
   an actuator operable to cause said optical head to move and position over the disk;
   two parallel springs each having one end engaged to said actuator and another end to hold said optical head, said two parallel springs displaced from each other along a direction substantially perpendicular to the optical disk and configured to confine movement of said optical head relative to said actuator along said direction; and
   a load actuator operable to apply a force to cause said optical head to contact the optical disk at a contact location of said optical interfacing surface when reading or writing data.

11. The device as in claim 10, wherein said optical interfacing surface of said coupling lens is a curved surface with a protruded apex at or near which said optical interfacing surface is on contact with the optical disk under said force.

12. The device as in claim 10, wherein said optical head includes a carrier that holds said objective and said coupling lenses, said carrier having a carrier surface substantially in said curved surface.

13. The device as in claim 12, wherein said carrier surface includes a plurality grooves to reduce air resistance of said optical head when said optical interfacing surface is in contact with the spinning optical disk.

14. The device as in claim 10, further comprising a flexure engaged between said two parallel springs and said optical head to allow said optical head move along said direction relative to said two parallel springs, said flexure having two support pads substantially in a common plane with said contact location of said optical interfacing surface, wherein said load actuator is operable to press said two support pads and said contact location of said optical interfacing surface on the optical disk when said force is applied when reading or writing data.

15. The device as in claim 10, wherein said load actuator includes has a first load actuator part engaged to said actuator and a second actuator part engaged to said optical head, said first and said second load actuator parts operable to move relative to each other along said direction in response to a load control signal.

16. The device as in claim 15, wherein one load actuator part includes a permanent magnet and the other load actuator part includes a magnetic cell.

17. The device as in claim 16, wherein said other load actuator part further includes a second magnet that attracts to said permanent magnet, and wherein said magnetic coil is designed to repel from said permanent magnet when receiving a driving current to load said optical head on the optical disk.

18. The device as in claim 10, further comprising a lens actuator engaged to at least one of said objective and said coupling lenses and operable to change a spacing therebetween in response to a control signal.

19. The device as in claim 18, wherein said lens actuator includes a piezo-electric element.

20. The device as in claim 18, wherein said lens actuator includes an electrostatic element.

21. The device as in claim 18, wherein said lens actuator includes an electromagnetic element.

22. The device as in claim 18, wherein said coupling lens is engaged to a diaphragm spring to move relative to said objective lens when said diaphragm is deformed.

* * * * *

UNITED STATES PATENT AND TRADEMARK OFFICE
CERTIFICATE OF CORRECTION

PATENT NO. : 7,102,992 B1 Page 1 of 1
APPLICATION NO. : 09/917250
DATED : September 5, 2006
INVENTOR(S) : Warren Dalziel It is certified that error appears in the above-identified patent and that said Letters Patent is hereby corrected as shown below:

Please correct the Title Page of the patent as shown below:

(73) Assignee: ~~TermStor~~ Corporation, Milpitas, California should read

(73) Assignee: TeraStor Corporation, Milpitas, California

Signed and Sealed this

Second Day of January, 2007

JON W. DUDAS
*Director of the United States Patent and Trademark Office*